UNITED STATES PATENT OFFICE.

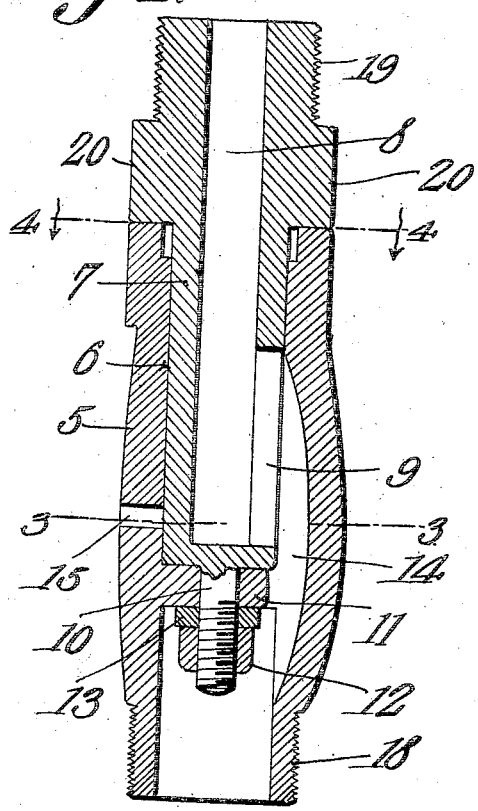
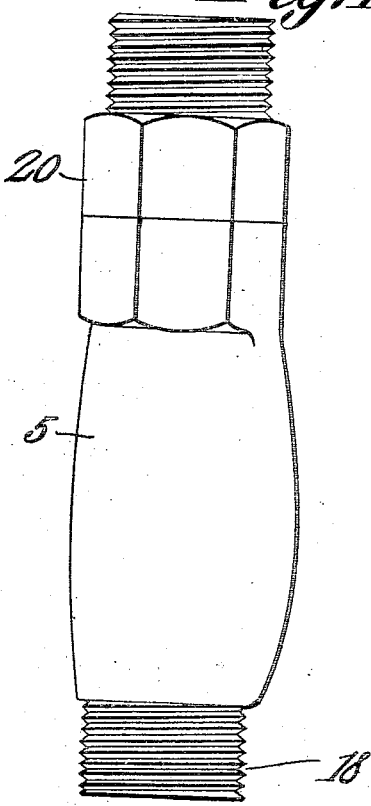
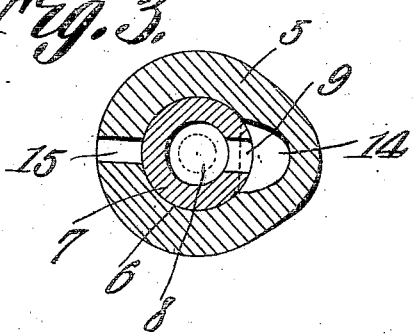
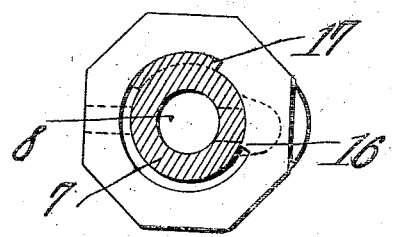

SAMUEL A. BIGGERS, OF McLEAN, TEXAS.

VALVE.

953,683.

Specification of Letters Patent.   Patented Apr. 5, 1910.

Application filed January 18, 1909.   Serial No. 472,858.

*To all whom it may concern:*

Be it known that I, SAMUEL A. BIGGERS, a citizen of the United States, residing at McLean, in the county of Gray and State of Texas, have invented a new and useful Valve, of which the following is a specification.

This invention relates more particularly to valves for hydrants, and its object is to provide a valve of this kind which is simple in structure, and which can be readily fitted to any line of piping.

The invention also has for its object to provide a valve which can be easily operated, and also to provide improved means for draining the valve, to prevent freezing.

With the foregoing objects in view, the invention consists in a novel construction and arrangement of parts, to be hereinafter described and claimed, reference being had to the drawing hereto annexed, in which:—

Figure 1 is an elevation of the valve. Fig. 2 is a central vertical section. Fig. 3 is a horizontal section on the line 3—3 of Fig. 2. Fig. 4 is a similar view, on the line 4—4 of Fig. 2.

In the drawing 5 denotes the body of the valve, the same being substantially cylindrical-shaped, and having a central bore 6, to receive the turning plug 7. The latter is hollow, its bore being indicated at 8. In the wall of the turning plug is a port 9, which communicates with the bore 8. The lower end of the turning plug is formed with a stem 10, which passes through a central opening in a partition 11, extending across the bore 6. Said stem is screw-threaded and receives a nut 12, a washer 13 being interposed between said nut and the partition 11, whereby the turning plug is secured in place within the valve body.

In the wall of the valve body is a port or passage 14, which opens at its ends into the bore 6 above and below the partition 11, respectively. That portion of the port 14 which communicates with the bore 6 above the partition, is of substantially the same length as the port 9, and said ports are in the same plane, so that the port 9 may be brought to register with the port 14 when the turning plug is rotated, and when this is done the water flows through the ports 14 and 9 into the bore 8, and thence into the stand pipe (not shown).

At a point diametrically opposite where the port 14 communicates with the bore 6, the valve body 5, has a waste port 15, which is also in the plane of the port 9, so that it will register therewith when the valve is closed, whereby the stand pipe is drained, and freezing of the valve is thus prevented.

The upper end of the bore 6 is enlarged, and in said enlarged portion is a stop projection 16, which is engageable by a similar projection 17 on the turning plug, said stops determining the open and closed positions of the valve.

The lower end of the valve body is reduced and screw-threaded, as indicated at 18, for connection to the main or piping, and the outer end of the turning plug also has a screw-threaded portion 19, for connection with the stand pipe. On the outside of the valve body, the turning plug is enlarged, as indicated at 20, and fits the upper end of said body. This enlarged portion of the turning plug, as well as the adjacent portion of the valve body, has an angular surface, the faces of said angular surfaces being adapted to coincide to facilitate the application of a wrench, in order that the parts may be readily fitted on the main or piping. Both surfaces may be simultaneously gripped by a wrench, so that the valve body may be screwed in place without turning the plug, and the plug may also be held stationary while the stand pipe is being screwed thereon.

The valve herein described can be used on any line of piping, and any number may be used without interfering with each other. It can be set in a line of pipe with only a T-coupling, and on the end of the line with only an elbow.

What is claimed is:—

In a valve, a body having a cylindrical bore provided at one end with an arcuate enlargement, there being a partition formed integrally in the body and extended into the bore; a hollow cylindrical turning plug arranged to fit closely in the bore and to rest terminally upon the partition, the lower end of the plug having a stem extended through the partition, the upper end of the plug being enlarged to cover and to rest upon the upper end of the body to constitute a closure for the arcuate enlargement of the bore; and means carried by the stem and engageable by the partition to hold the lower end of the plug against the partition and to hold the enlarged portion of the plug against the upper end of the body; there being an inlet port in the side of the plug and an inlet port in the side of the body opening below the stem, the body having an outlet port; there being a projection upon the plug engageable by the body at the ends of the arcuate enlargement therein, to position the plug to close the ports in the body alternately, and to aline the port in the plug with said body ports alternately.

In testimony that I claim the foregoing as my own, I have hereto affixed my signature in the presence of two witnesses.

SAMUEL A. BIGGERS.

Witnesses:
CHRISTPHR C. COOPER,
SAMUEL W. COUSINS.